(12) United States Patent
Dai et al.

(10) Patent No.: US 10,978,962 B2
(45) Date of Patent: Apr. 13, 2021

(54) POWER SUPPLY SYSTEM WITH REDUCED BULK CAPACITANCE

(71) Applicant: Huawei Technologies Co., Ltd., Shenzhen (CN)

(72) Inventors: Heping Dai, Plano, TX (US); Liming Ye, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/502,500

(22) Filed: Jul. 3, 2019

(65) Prior Publication Data

US 2019/0348923 A1    Nov. 14, 2019

Related U.S. Application Data

(63) Continuation of application No. PCT/CN2018/107338, filed on Sep. 25, 2018.

(60) Provisional application No. 62/723,361, filed on Aug. 27, 2018, provisional application No. 62/562,641, filed on Sep. 25, 2017.

(51) Int. Cl.
| | |
|---|---|
| *H02M 7/06* | (2006.01) |
| *H02M 1/08* | (2006.01) |
| *H02M 1/44* | (2007.01) |
| *H02M 3/155* | (2006.01) |
| *H02M 7/217* | (2006.01) |

(52) U.S. Cl.
CPC ............ *H02M 7/06* (2013.01); *H02M 1/08* (2013.01); *H02M 1/44* (2013.01); *H02M 3/155* (2013.01); *H02M 7/217* (2013.01)

(58) Field of Classification Search
None
See application file for complete search history.

(56) References Cited

U.S. PATENT DOCUMENTS

| | | | |
|---|---|---|---|
| 5,581,171 A | 12/1996 | Kerfoot et al. | |
| 5,834,924 A | 11/1998 | Konopka et al. | |
| 6,314,002 B1 | 11/2001 | Qian et al. | |
| 9,215,770 B2* | 12/2015 | Mazumdar | ............ H05B 45/37 |
| 9,510,401 B1* | 11/2016 | Kost | ...................... H05B 45/14 |

(Continued)

FOREIGN PATENT DOCUMENTS

| | | |
|---|---|---|
| CN | 1202759 A | 12/1998 |
| CN | 1636309 A | 7/2005 |

(Continued)

OTHER PUBLICATIONS

Yang, Jiang-Jun et al.,"A High Efficiency Bridgeless PFC Circuit based on One Cycle Control Strategy" Power Electronics, vol. 43, No. 7, Jul. 2009, 9 pages.

*Primary Examiner* — Jeffrey A Gblende
(74) *Attorney, Agent, or Firm* — Slater Matsil, LLP

(57) ABSTRACT

A method includes detecting a voltage across a bulk capacitor of a power supply system, wherein the power supply system comprises a rectifier, a boost converter and a power converter, and wherein the bulk capacitor is between the boost converter and the power converter, activating the boost converter after the voltage across the bulk capacitor decreases and reaches a first voltage threshold and disabling the boost converter after the voltage across the bulk capacitor increases and reaches a second voltage threshold, wherein the second voltage threshold is greater than the first voltage threshold.

15 Claims, 7 Drawing Sheets

(56) References Cited

U.S. PATENT DOCUMENTS

| | | | |
|---|---|---|---|
| 2005/0105311 A1 | 5/2005 | Soldano | |
| 2007/0279955 A1* | 12/2007 | Liu | H02M 1/4208 |
| | | | 363/125 |
| 2008/0002444 A1 | 1/2008 | Shekhawat et al. | |
| 2008/0031014 A1 | 2/2008 | Young | |
| 2011/0149613 A1 | 6/2011 | Lanni | |
| 2013/0020872 A1* | 1/2013 | Kinnard | H02J 9/061 |
| | | | 307/64 |
| 2014/0328097 A1 | 11/2014 | Gumaer | |
| 2017/0187280 A1 | 6/2017 | Lee et al. | |

FOREIGN PATENT DOCUMENTS

| | | |
|---|---|---|
| CN | 1998126 A | 7/2007 |
| CN | 100585997 C | 1/2010 |
| CN | 103066825 A | 4/2013 |
| CN | 203942441 U | 11/2014 |
| CN | 104953811 A | 9/2015 |
| DE | 102008016754 A1 | 10/2009 |
| EP | 2442434 A2 | 4/2012 |
| JP | 2016220454 A | 12/2016 |
| KR | 20150125179 A | 11/2015 |

\* cited by examiner

POWER SUPPLY SYSTEM WITH REDUCED BULK CAPACITANCE

CROSS REFERENCE TO RELATED APPLICATIONS

This application is a continuation of International Application No. PCT/CN2018/107338, entitled, "Power Supply System with Reduced Bulk Capacitance" and filed on Sep. 25, 2018, which claims priority to U.S. Provisional Application Ser. No. 62/562,641, entitled, "Power Supply System with Reduced Bulk Capacitance" and filed on Sep. 25, 2017, and U.S. Provisional Application Ser. No. 62/723,361, entitled, "Power Supply System with Reduced Bulk Capacitance" and filed on Aug. 27, 2018, which applications are hereby incorporated herein by reference.

TECHNICAL FIELD

The present disclosure relates to a power supply system, and, in particular embodiments, to a power supply system having reduced bulk capacitance.

BACKGROUND

A power supply system (e.g., an adaptor) is used to convert the alternating current (ac) voltage from the utility companies into a direct current (dc) voltage suitable for electronic devices. In many applications, the power supply system is required to operate with a wide input voltage range. For example, in China and many European countries, the ac supply voltage from the utility companies is in a range from about 210 V to about 240 V and has a frequency of about 50 Hz. The voltage above is an RMS voltage. RMS stands for Root Mean Square. In North America, the ac supply voltage is in a range from about 100 V to about 120 V and has a frequency of about 60 Hz. Electronic devices such as a laptop computer may need a universal adapter so that the laptop computer can work in different countries.

The power supply system (e.g., an adaptor) usually includes an ac/dc stage (e.g., a rectifier) and an isolated dc/dc stage (e.g., an isolated dc/dc converter). The ac/dc stage converts the power from the ac utility line and establishes a dc bus for the isolated dc/dc stage. The ac/dc stage may comprise a variety of electromagnetic interference (EMI) filters and a bridge rectifier formed by four diodes. The EMI filters are employed to attenuate both differential mode noise and common mode noise. The bridge rectifier converts the ac voltage into a full-wave rectified dc voltage. Such a full-wave rectified dc voltage provides a steady dc input voltage for the isolated dc/dc stage through a plurality of smoothing capacitors coupled to the output of the bridge rectifier. The plurality of smoothing capacitors is also known as the bulk capacitor of the power supply system.

The isolated dc/dc stage converts the voltage of the dc bus to a voltage suitable to electronics loads such as tablets, printers, mobile phones, personal computers, any combinations thereof and the like. The isolated dc/dc stage can be implemented by using different power topologies, such as flyback converters, forward converters, half bridge converters, full bridge converters and the like.

In the power supply system (e.g., an adaptor), the bulk capacitor may occupy a large space of the printed circuit board (from about 30% to about 50%) of the adaptor. It would be desirable to have an adapter having reduced bulk capacitance so as to minimize the size of the adaptor.

SUMMARY

These and other problems are generally solved or circumvented, and technical advantages are generally achieved, by preferred embodiments of the present disclosure which provide a power supply system having reduced bulk capacitance.

In accordance with an embodiment, a system comprises a rectifier coupled to an input power source, a boost converter coupled between the rectifier and a bulk capacitor, the boost converter increasing a voltage across the bulk capacitor in response to the voltage across the bulk capacitor decreasing and reaching a predetermined threshold and an isolated power converter coupled to the bulk capacitor. In one example, the rectifier is a full-wave rectifier that is coupled in cascade with the boost converter between the input power source and the bulk capacitor. In the same example, or another example, the boost converter is a charge pump converter. In any one of the preceding examples, or in yet another example, the rectifier and the boost converter are implemented as a first boost converter and a second boost converter coupled in parallel between the input power source and the bulk capacitor. In any one of the preceding examples, or in yet another example, the first boost converter configured to be activated during a first half cycle of the input power source, and the second boost converter configured to be activated during a second half cycle of the input power source. In any one of the preceding examples, or in yet another example, the first boost converter comprises a first switch, a first blocking diode and an inductor, the second boost converter comprises a second switch, a second blocking diode and the inductor, wherein the inductor is coupled between the input power source and a common node of the first switch and the first blocking diode, wherein a cathode of the first blocking diode and a cathode of the second blocking diode are coupled together and further coupled to the bulk capacitor, and wherein a common node of the second switch and the second blocking diode is coupled to the input power source. In any one of the preceding examples, or in yet another example, the system further includes a controller configured to detect at least one voltage of the voltage across the bulk capacitor or an output voltage of the rectifier, and generate at least one signal to control the boost converter.

In accordance with another embodiment, a method comprises detecting a voltage across a bulk capacitor of a power supply system, the power supply system comprising a rectifier, a boost converter coupled to the rectifier, a power converter and the bulk capacitor coupled between the boost converter and the power converter, activating the boost converter after the voltage across the bulk capacitor decreases and reaches a first voltage threshold and disabling the boost converter after the voltage across the bulk capacitor increases and reaches a second voltage threshold, the second voltage threshold being greater than the first voltage threshold. In one example, the rectifier is a full-wave rectifier, and the boost converter is a boost converter including a switch that is configured to adjust the voltage across the bulk capacitor. In the same example, or in another example, the method further includes during the step of activating the boost converter, turning on and off the switch until the voltage across the bulk capacitor is equal to the second voltage threshold and during the step of disabling the boost converter, turning off the switch. In any one of the preceding examples, or in yet another example, the method further includes after the step of disabling the boost converter, activating the boost converter after the voltage across the bulk capacitor decreases and reaches a third voltage threshold between the first voltage threshold and the second voltage threshold and disabling the boost converter after the voltage across the bulk capacitor increases and reaches a fourth voltage threshold between the first voltage threshold and the second voltage threshold, wherein the fourth voltage threshold is greater than the third voltage threshold, wherein the third voltage threshold and the fourth voltage threshold are thresholds for adjusting the voltage across the bulk capacitor. In any one of the preceding examples, or in yet another example, the method further includes after the step of disabling the boost converter, activating the boost converter after the voltage across the bulk capacitor decreases and reaches the third voltage threshold and disabling the boost converter after the voltage across the bulk capacitor increases and reaches the second voltage threshold. In any one of the preceding examples, or in yet another example, the first voltage threshold is a minimum input voltage of the power converter, and the second voltage threshold is a maximum input voltage of the power converter. In any one of the preceding examples, or in yet another example, the method further includes detecting, by a controller, the voltage across the bulk capacitor and a voltage at an output of the rectifier and generating, by the controller, a control signal for controlling the boost converter based upon the voltage across the bulk capacitor and the voltage at the output of the rectifier. Other examples are also possible.

In accordance with yet another embodiment, a method comprises detecting a voltage across a bulk capacitor of a power supply system, the power supply system comprising a boost converter coupled to the bulk capacitor, applying a first pulse width modulation (PWM) mode to at least one switch of the boost converter after the voltage across the bulk capacitor reaches a first voltage threshold and applying an always-off mode to at least one switch of the boost converter after the voltage across the bulk capacitor reaches a second voltage threshold, the second voltage threshold being greater than the first voltage threshold. In an example, the boost converter is a boost converter configured to adjust the voltage across the bulk capacitor. In the same example, or in another example, the boost converter includes a first boost converter and a second boost converter coupled in parallel between an input power source and the bulk capacitor, the first boost converter configured to be activated during a first half cycle of the input power source, and the second boost converter configured to be activated during a second half cycle of the input power source. In any one of the preceding examples, or in yet another example, the method further includes after the step of applying the always-off mode to the at least one switch of the boost converter after the voltage across the bulk capacitor reaches the second voltage threshold, applying a second PWM mode to the at least one switch of the boost converter after the voltage across the bulk capacitor reaches a third voltage threshold between the first voltage threshold and the second voltage threshold applying the always-off mode to the at least one switch of the boost converter after the voltage across the bulk capacitor reaches the second voltage threshold; applying a third PWM mode to the at least one switch of the boost converter after the voltage across the bulk capacitor reaches a fourth voltage threshold between the first voltage threshold and the second voltage threshold, wherein the third voltage threshold is greater than the fourth voltage threshold; and applying the always-off mode to the at least one switch of the boost converter after the voltage across the bulk capacitor reaches a fifth voltage threshold between the first voltage threshold and the second voltage threshold, wherein the fifth voltage threshold is greater than the third voltage threshold, wherein the third voltage threshold, the fourth voltage threshold and the fifth voltage threshold are thresholds for adjusting the voltage across the bulk capacitor. Other examples are also possible.

An advantage of an embodiment of the present disclosure is the bulk capacitance of an ac/dc power supply system can be reduced through controlling a boost converter. The reduced bulk capacitance helps to reduce the size of the ac/dc power supply system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an ac/dc power supply system having reduced bulk capacitance. The present disclosure may also be applied, however, to a variety of power supply systems. Hereinafter, various embodiments will be explained in detail with reference to the accompanying drawings.

Figure 1:
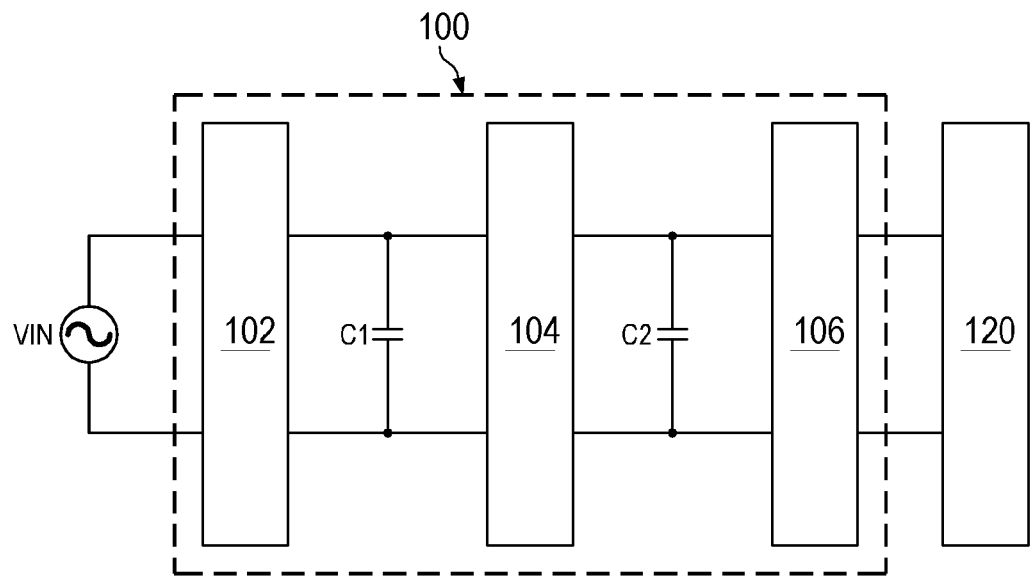
FIG. 1 illustrates a block diagram of a power supply system in accordance with various embodiments of the present disclosure.

FIG. 1 illustrates a block diagram of a power supply system in accordance with various embodiments of the present disclosure. The power supply system 100 is coupled between an input ac source VIN and a load 120. As shown in FIG. 1, the power supply system 100 includes a front-end stage 102, a boost apparatus 104 and a power conversion stage 106. The front-end stage 102, the boost apparatus 104 and the power conversion stage 106 are coupled in cascade between the input ac source and the load 120. As shown in FIG. 1, a first capacitor C1 is placed between an output of the front-end stage 102 and an input of the boost apparatus 104. The first capacitor C1 is employed to smooth the output voltage of the front-end stage 102. It should be noted that, depending on different applications and design needs, the first capacitor C1 may be not included in the power supply system 100, or the first capacitor C1 has a small capacitance value. A second capacitor C2 is placed between an output of the boost apparatus 104 and an input of the power conversion stage 106. The second capacitor C2 is employed to produce a steady and smooth output voltage at the output of the boost apparatus 104. Throughout the description, the second capacitor C2 is alternatively referred to as a bulk capacitor. The terms "boost apparatus" and "boost converter" are used interchangeably herein.

In some embodiments, the front-end stage 102 comprises an electromagnetic interference (EMI) filter and a rectifier coupled in cascade. The EMI filter is employed to reduce high frequency noise that may cause interference with other devices of the power supply system 100. As a result of employing the EMI filters, the power supply system 100 may meet various EMI regulations. The rectifier is employed to convert alternating current to direct current.

The EMI filter may comprise a plurality of passive components including capacitors and inductors. The inductors allow dc or low frequency currents to pass through, while blocking the unwanted high frequency currents. The capacitors provide low impedance paths to divert the unwanted high frequency currents or noise from the EMI filter. The unwanted high frequency currents either go back into the input power source or into ground.

In some embodiments, the EMI filter is designed to attenuate both differential mode noise and common mode noise. The EMI filter may comprise two differential-mode inductors, two common-mode inductors and a plurality of filter capacitors. The two differential-mode inductors along with the plurality of filter capacitors are implemented to filter out differential-mode noise within the power supply system 100. The two common-mode inductors are utilized to filter out common-mode noise within the power supply system 100. In some embodiments, the two common-mode inductors are coupled inductors.

In some embodiments, the rectifier is a full-wave bridge rectifier. The rectifier comprises four rectifying diodes coupled in a closed loop bridge configuration. The four diodes are arranged in series pairs with only two diodes conducting current during each half cycle. During a positive half cycle of the input ac power source, a first diode and a second diode conduct in series while a third diode and a fourth diode are reverse biased and the current flows through the load through the first diode and the second diode. During a negative half cycle of the input ac power source, the third diode and the fourth diode conduct in series while the first diode and the second diode are reverse biased and the current flows through the load through the third diode and the fourth diode.

The boost apparatus 104 may be implemented as any suitable boost converters. In some embodiments, the boost apparatus 104 is a boost converter comprising an inductor, a switch and a blocking diode. The inductor is coupled between the capacitor C1 and a common node of the switch and the blocking diode. In alternative embodiments, the boost apparatus 104 is a boost converter comprising an inductor, a first switch and a second switch. The inductor is coupled between the capacitor C1 and a common node of the first switch and the second switch. Furthermore, the boost apparatus 104 may be implemented as a charge pump converter. Depending on design needs and different applications, the charge pump converter can be a voltage doubler, a voltage quadrupler, a voltage multiplier, any combinations thereof and the like. The detailed structure of the boost apparatus 104 will be described below with respect to FIG. 2.

The power conversion stage 106 comprises a power converter. In some embodiments, the power converter is implemented as an isolated converter such as a flyback converter, a forward converter, a push-pull converter, an inductor-inductor-capacitor (LLC) resonant converter, a half-bridge converter, a full-bridge converter, any combinations thereof and the like. Throughout the description, the power conversion stage 106 is alternatively referred to as an isolated power converter.

Figure 2:
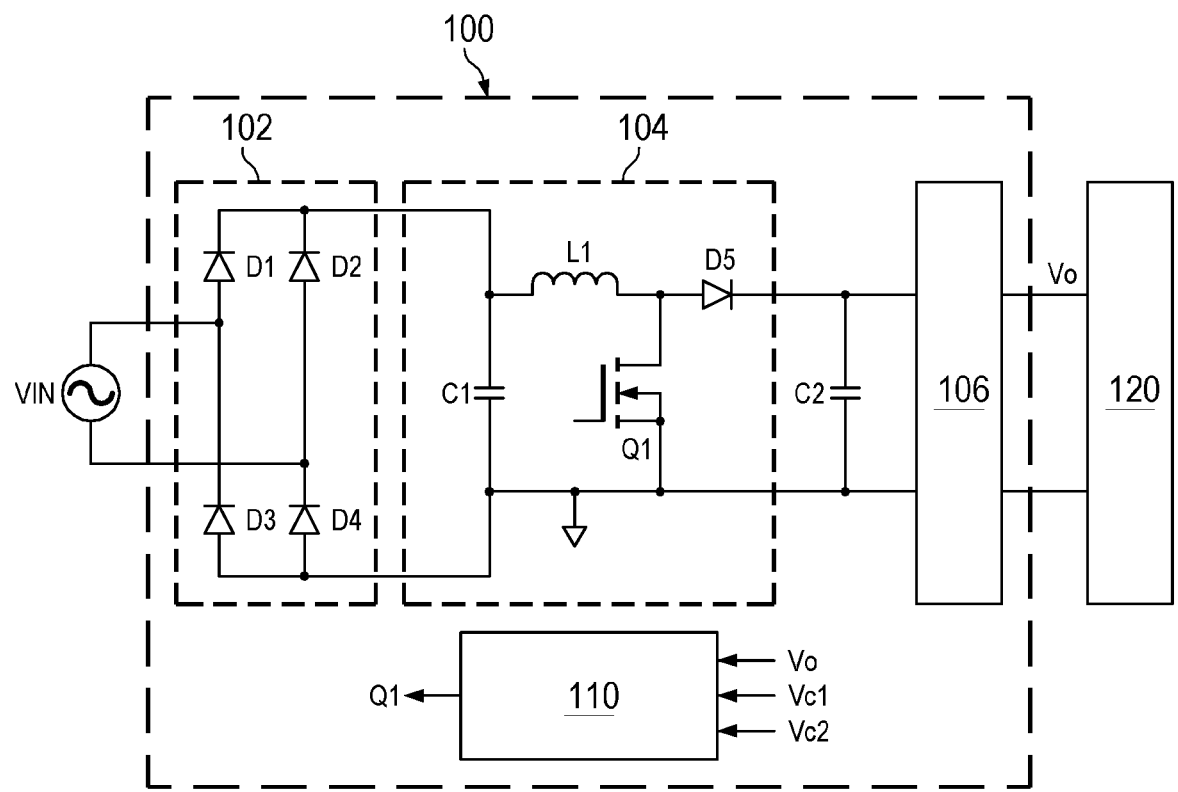
FIG. 2 illustrates a schematic diagram of the power supply system shown in FIG. 1 in accordance with various embodiments of the present disclosure.

FIG. 2 illustrates a schematic diagram of the power supply system shown in FIG. 1 in accordance with various embodiments of the present disclosure. The power supply system 100 is coupled between the ac power source VIN and the load 120. The power supply system 100 includes the front-end stage 102, the first capacitor C1, the boost apparatus 104, the bulk capacitor C2 and the isolated power converter 106 coupled in cascade between the ac power source VIN and the load 120.

In some embodiments, the front-end stage 102 is implemented as a full-wave diode rectifier. Throughout the description, the front-end stage 102 is alternatively referred to as the rectifier 102. As shown in FIG. 2, the rectifier 102 comprises a first diode D1, a second diode D2, a third diode D3 and a fourth diode D4. The first diode D1 and the third diode D3 are coupled in series. The second diode D2 and the fourth diode D4 are coupled in series. A first output terminal of the ac power source VIN is coupled to a common node of the first diode D1 and the third diode D3. A second output terminal of the ac power source VIN is coupled to a common node of the second diode D2 and the fourth diode D4. The common node of the first diode D1 and the second diode D2 is coupled to a first terminal of the first capacitor C1. The common node of the third diode D3 and the fourth diode D4 is coupled to a second terminal of the first capacitor C1.

In operation, during a positive half cycle of the ac power source VIN, the first diode D1 and the fourth diode D4 conduct in series while the second diode D2 and the third diode D3 are reverse biased and the current flows from the ac power source VIN to the boost apparatus 104 through the first diode D1 and the fourth diode D4. During a negative half cycle of the ac power source VIN, the second diode D2 and the third diode D3 conduct in series while the first diode D1 and the fourth diode D4 are reverse biased and the current flows from the ac power source VIN to the boost apparatus 104 through the second diode D2 and the third diode D3. The rectifier 102 converts the ac input waveform to a pulsating dc waveform. The first capacitor C1 may be employed to reduce the ripple content of the pulsating dc waveform.

In some embodiments, the boost apparatus 104 is implemented as a boost converter. Throughout the description, the boost apparatus 104 is alternatively referred to as the boost converter 104. As shown in FIG. 2, the boost converter 104 comprises an inductor L1, a switch Q1 and a diode D5. The inductor L1 is coupled between the first capacitor C1 and a common node of the switch Q1 and the diode D5. In some embodiments, the switch Q1 is implemented as an n-type metal oxide semiconductor field effect transistor (MOSFET) device. The drain of the switch Q1 is coupled to the common node of the inductor L1 and the diode D5. The source of the switch Q1 is coupled to ground. The gate of the switch Q1 is configured to receive a control signal from the controller 110. The diode D5 has an anode coupled to the common node of the inductor L1 and the switch Q1, and a cathode coupled to the bulk capacitor C2.

The isolated power converter 106 can be implemented as an isolated dc/dc converter. In some embodiments, the power converter can be implemented as an isolated converter such as a flyback converter, a forward converter, a push-pull converter, an LLC resonant converter, a half-bridge converter, a full-bridge converter, any combinations thereof and the like. The isolated power converter 106 can be employed to convert the voltage across the bulk capacitor C2 into a lower voltage suitable for the load 120. In addition, the isolated power converter 106 also provides galvanic isolation, thereby improving the safety of the power supply system 100.

The controller 110 may detect the voltage across the outputs of the isolated power converter 106, the voltage across the terminals of the first capacitor C1 and the voltage across the terminals of the bulk capacitor C2. Based upon at least one of the detected voltages (e.g., the voltage across the terminals of the bulk capacitor C2), the controller 110 generates a gate drive signal to control the on/off of the switch Q1. The detailed operation principle of the controller 110 will be described below with respect to FIGS. 3-7.

It should be noted that generating the gate drive signal based upon the voltage across the terminals of the bulk capacitor C2 is merely an example. A person skilled in the art will recognize that there may be a variety of alternatives for implementing this function. For example, the controller 110 may detect the voltage across the two terminals of the first capacitor C1 and use the detected voltage across the two terminals of the capacitor C1 to determine the on/off of the switch Q1.

It should further be noted that while FIG. 2 shows the controller 110 is employed to generate the gate signals for the power supply system 100, a person skilled in the art will recognize that there may be a variety of alternatives for implementing the function of the controller no. For example, the controller 110 may be replaced by discrete components. Furthermore, there may be one dedicated driver or multiple dedicated drivers coupled between the controller 110 and the switch Q1.

In sum, the power supply system 100 and the controller 110 illustrated herein is limited solely for the purpose of clearly illustrating the inventive aspects of the various embodiments. The present invention is not limited to any particular power topology. For example, the diode D5 may be replaced by a switch.

The switch (e.g., switch Q1) shown in FIG. 2 may be implemented as metal oxide semiconductor field effect transistor (MOSFET) devices. Alternatively, the switches may be implemented as other suitable controllable devices such as n-type metal oxide semiconductor (NMOS) transistors, bipolar junction transistor (BJT) devices, super junction transistor (SJT) devices, insulated gate bipolar transistor (IGBT) devices, gallium nitride (GaN) based power devices and/or the like.

It should further be noted that while FIG. 2 illustrates one switch (e.g., Q1), various embodiments of the present disclosure may include other variations, modifications and alternatives. For example, the switch Qi may be replaced by a plurality of switches coupled in parallel.

In operation, the switch Q1 may be configured to operate as an always-off switch. As a result, the current flows from the rectifier 102 to the isolated power converter 106 through a conductive path formed by the inductor L1 and the diode D5. The controller 110 detects the voltage across the bulk capacitor C2. When the voltage across the bulk capacitor C2 drops to a voltage level equal to a first voltage threshold, the controller 110 activates the boost converter 104 by turning on and off the switch Q1. In response to the turn-on and turn-off the switch Q1, the voltage across the bulk capacitor C2 increases accordingly. After the voltage across the bulk capacitor C2 reaches a second voltage threshold, the controller 110 disables the boost converter 104 by configuring the switch Q1 to operate as an always-off switch.

In some embodiments, the second voltage threshold is greater than the first voltage threshold. It should be noted that both the first voltage threshold and the second voltage threshold are predetermined. In some embodiments, the first voltage threshold is the minimum input voltage of the isolated power converter 106. The second voltage threshold is the maximum input voltage of the isolated power converter 106. It should be noted that, depending on different applications and design needs, both the first voltage threshold and the second voltage threshold may vary accordingly. Furthermore, additional voltage thresholds may be employed to better control the voltage variation on the bulk capacitor C2.

One advantageous feature of having the boost converter 104 shown in FIG. 2 is that the boost converter 104 can increase the voltage across the bulk capacitor C2 before the voltage across the bulk capacitor C2 drops out of the minimum voltage to which the isolated power converter 106 is specified. As a result, a smaller bulk capacitor can be used, thereby reducing the size of the bulk capacitor.

In some embodiments, by increasing the voltage across the bulk capacitor C2 through the boost converter, the size of the bulk capacitor may be reduced by 97% in comparison with a conventional power supply system. For example, in a conventional power supply system, the bulk capacitor is a capacitor of 68 uF with a 400 V voltage rating. The diameter of this capacitor is about 18 mm and the height of the capacitor is about 25 mm. In contrast, a smaller bulk capacitor (e.g., 2.2 uF capacitor) and a corresponding boost converter only occupies about 3% of the space of the bulk capacitor of the conventional power supply system. For example, the inductor of the boost converter 104 counts for about from 80% to about 90% of the size of the boost converter 104. The inductor is a 7.1 A inductor having a width of 6.6 mm, a length of 7.0 mm and a thickness of 3.0 mm. The inductor of the boost converter only occupies about 3% of the space occupied by the 68 uF capacitor. In sum, the capacitor size reduction helps to improve the integration density of the power supply system 100.

FIGS. 3-7 illustrates various waveforms of the power supply system 100 shown in FIG. 2 under different operating conditions. Depending on different input voltages, the power supply system shown in FIG. 2 may operate in either a low input voltage line or a high input voltage line. More particularly, when the input ac source VIN has a voltage of 220 V (RMS value) and the peak voltage of the ac waveform is about 300 V, the power supply system 100 operates at a high voltage line. On the other hand, when the input ac source VIN has a voltage of 100 V and the peak voltage of the ac waveform is about 150 V, the power supply system 100 operates at a low voltage line.

Figure 3:
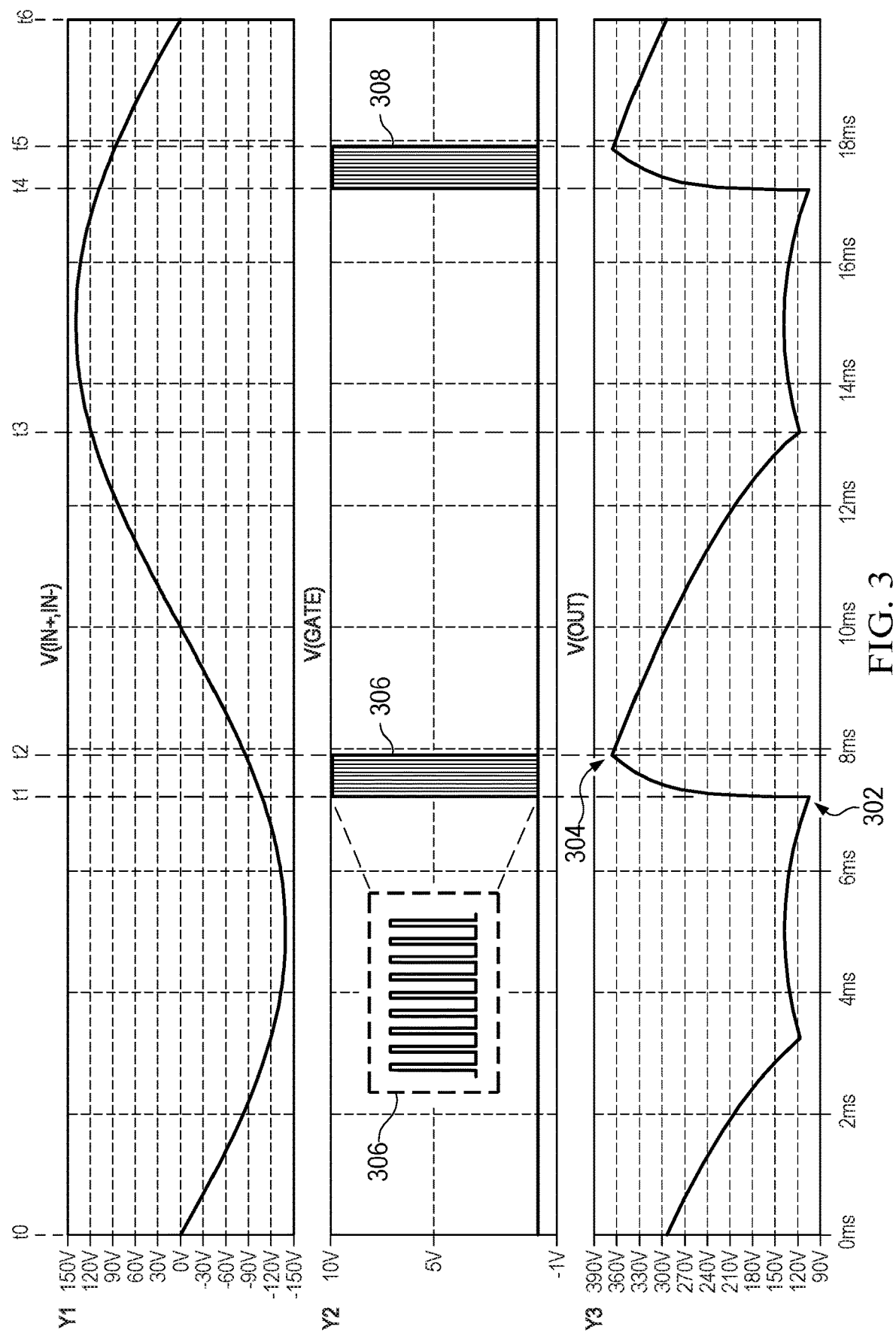
FIG. 3 illustrates various waveforms of the power supply system shown in FIG. 2 when the power supply system operates under a first control scheme in accordance with various embodiments of the present disclosure.

FIG. 3 illustrates various waveforms of the power supply system shown in FIG. 2 when the power supply system operates under a first control scheme in accordance with various embodiments of the present disclosure. The horizontal axis of FIG. 3 represents intervals of time. There may be three vertical axes. The first vertical axis Y1 represents the input voltage of the power supply system. The second vertical axis Y2 represents the gate drive signal of the boost converter shown in FIG. 2. The third vertical axis Y3 represents the voltage across the bulk capacitor C2.

The waveforms shown in FIG. 3 are generated when the power supply system shown in FIG. 2 operates at a low input voltage line. The load of the power supply system is about 45 W. A bulk capacitor of 4.0 uF is employed in the power supply system. Since the capacitance of the bulk capacitor is small, the bulk capacitor may be implemented as a ceramic capacitor.

As shown in FIG. 3, the time from t0 to t6 represents one cycle of the input waveform. The input waveform has a frequency of 50 Hz. The cycle of the input waveform is about 20 milliseconds.

At the time instant t1, the voltage across the bulk capacitor C2 drops to a voltage level approximately equal to a first voltage threshold 302. The boost converter starts to switch and the voltage across the bulk capacitor C2 increases accordingly. During the time from t1 to t2, the switch of the boost converter is turned on and off as indicated by the gate drive signal 306. In other words, a PWM mode is applied to the switch of the boost converter. In response to the turn-on and turn-off of the switch, the voltage across the bulk capacitor C2 increases from the first voltage threshold 302 to a second voltage threshold 304.

At t2, after the voltage across the bulk capacitor C2 reaches the second voltage threshold 304, the boost converter stops switching and the voltage across the bulk capacitor C2 starts to drop. At t3, the voltage across the bulk capacitor C2 drops to a voltage level approximately equal to or above the first voltage threshold 302. It is not necessary to activate the boost converter at t3 to increase the voltage across the bulk capacitor C2 because FIG. 3 shows the line voltage starts to increase above the first voltage threshold 302 at t3. It should be noted that the gate drive signals 306 may comprise a plurality of pulses as indicated by the waveform inside the dashed rectangle shown in FIG. 3.

In some embodiments, the first voltage threshold 302 is the minimum voltage to which the isolated power converter 106 is specified. The second voltage threshold 304 is the maximum voltage to which the isolated power converter 106 is specified. In the current case, the first voltage threshold 302 is about 110 V. The second voltage threshold 304 is about 360 V.

It should be noted the first voltage threshold 302 and the second voltage threshold 304 described above are merely an example, which should not unduly limit the scope of the claims. One of ordinary skill in the art would recognize many variations, alternatives, and modifications. For example, the first voltage threshold 302 may be a voltage between the minimum voltage and the maximum voltage of the isolated power converter 106.

FIG. 3 further shows the boost converter is activated twice in each cycle. In other words, the boost converter has two activating periods during each cycle. As shown in FIG. 3, in a first half cycle, the boost converter is activated from t1 to t2. Likewise, in a second half cycle, the boost converter is activated from t4 to t5 as indicated by the gate drive signals 308. The operation principle of the boost converter during the time from t4 to t5 is similar to that of the boost converter during the time from t1 to t2, and hence is not discussed in further detail to avoid repetition.

It should be noted that the two activating periods (from t1 to t2 and from t4 to t5) shown in FIG. 3 are two short periods. As a result, these two activating periods only generate minimal power losses (e.g., switching losses).

The bulk capacitor C2 can be employed to keep the voltage applied to the isolated power converter 106 over the minimum voltage to which the isolated power converter 106 is specified. Without having the boost converter and the first control scheme applied to the boost converter (one activating period in each half cycle), a large bulk capacitor (e.g., a 68 uF capacitor) is necessary for keeping the voltage across the bulk capacitor over the minimum voltage of the isolated power converter 106. The boost converter can increase the voltage across the bulk capacitor C2 when necessary. As a result, a smaller bulk capacitor (e.g., a 4.0 uF capacitor) may be used to maintain the voltage across the bulk capacitor over the minimum voltage of the isolated power converter 106.

Figure 4:
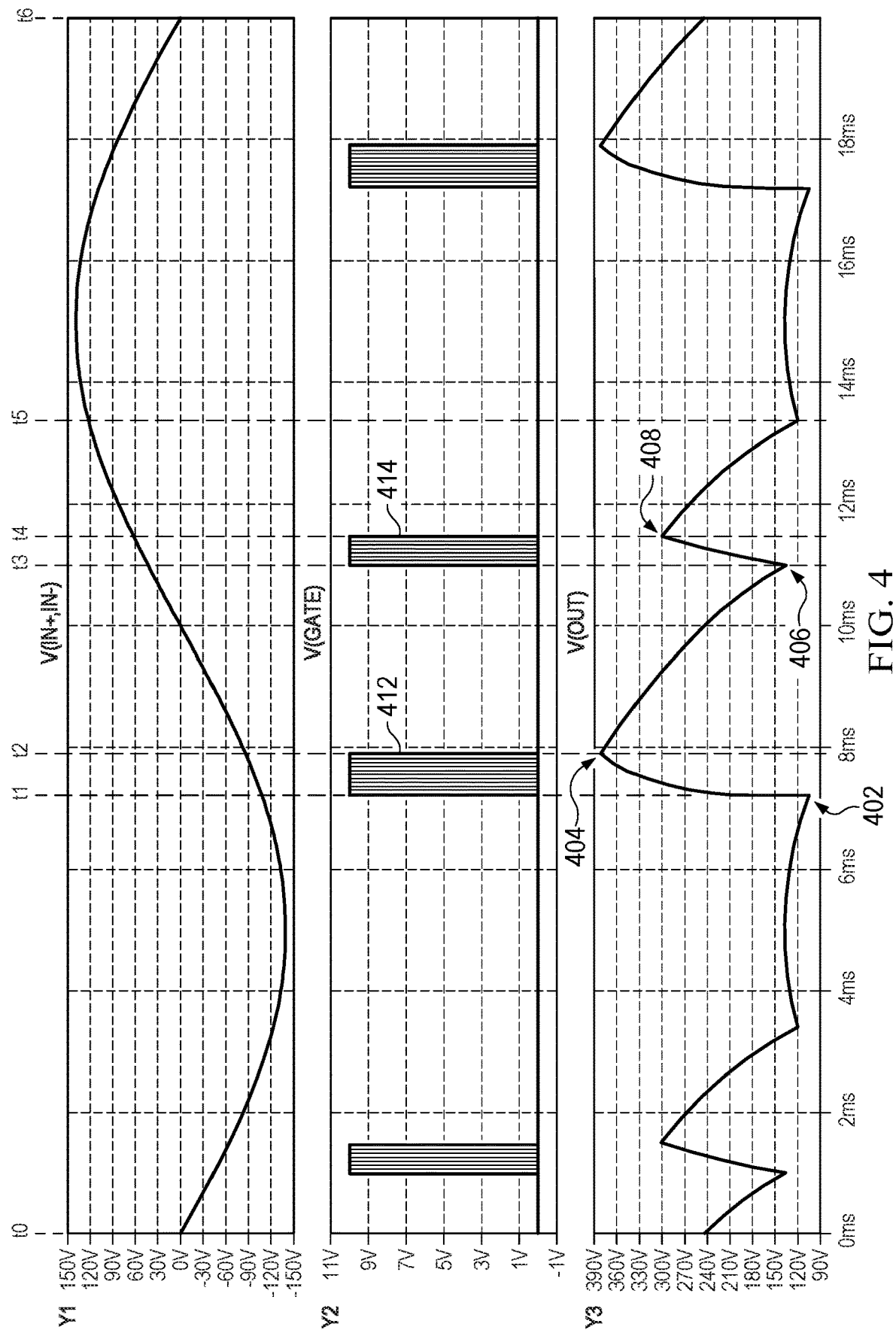
FIG. 4 illustrates various waveforms of the power supply system shown in FIG. 2 when the power supply system operates under a second control scheme in accordance with various embodiments of the present disclosure.

FIG. 4 illustrates various waveforms of the power supply system shown in FIG. 2 when the power supply system operates under a second control scheme in accordance with various embodiments of the present disclosure. The horizontal axis of FIG. 4 represents intervals of time. There may be three vertical axes. The first vertical axis Y1 represents the input voltage of the power supply system. The second vertical axis Y2 represents the gate drive signal of the boost converter shown in FIG. 2. The third vertical axis Y3 represents the voltage across the bulk capacitor C2.

The waveforms shown in FIG. 4 are generated when the power supply system shown in FIG. 2 operates at a low input voltage line. The load of the power supply system is about 45 W. A bulk capacitor of 2.2 uF is employed in the power supply system.

As shown in FIG. 4, the time from t0 to t6 represents one cycle of the input waveform. The input waveform has a frequency of 50 Hz. The cycle of the input waveform is about 20 milliseconds.

At the time instant t1, the voltage across the bulk capacitor C2 drops to a voltage level approximately equal to a first voltage threshold 402. The boost converter starts to switch and the voltage across the bulk capacitor C2 increases accordingly. During the time from t1 to t2, the switch of the boost converter can be turned on and off as indicated by the gate drive signal 412. In response to the turn-on and turn-off of the switch, the voltage across the bulk capacitor C2 increases from the first voltage threshold 402 to the second voltage threshold 404. At t2, after the voltage across the bulk capacitor C2 reaches the second voltage threshold 404, the boost converter stops switching and the voltage across the bulk capacitor C2 starts to drop.

At the time instant t3, the voltage across the bulk capacitor C2 drops to a voltage level approximately equal to a third voltage threshold 406. The boost converter starts to switch and the voltage across the bulk capacitor C2 increases accordingly. During the time from t3 to t4, the switch of the boost converter can be turned on and off as indicated by the gate drive signal 414. In response to the turn-on and turn-off of the switch, the voltage across the bulk capacitor C2 increases from the third voltage threshold 406 to a fourth voltage threshold 408. At t4, after the voltage across the bulk capacitor C2 reaches the fourth voltage threshold 408, the boost converter stops switching and the voltage across the bulk capacitor C2 starts to drop.

At t5, the voltage across the bulk capacitor C2 drops to a voltage level approximately equal to or above the first voltage threshold 402. It is not necessary to activate the boost converter at t5 because FIG. 4 shows the line voltage starts to increase above the first voltage threshold 402 at t5.

In some embodiments, the first voltage threshold 402 is the minimum voltage to which the isolated power converter 106 is specified. The second voltage threshold 404 is the maximum voltage to which the isolated power converter 106 is specified. In the current case, the first voltage threshold 402 is about 110 V. The second voltage threshold 404 is about 360 V. The third voltage threshold 406 and the fourth voltage threshold 408 are voltages between the first voltage threshold 402 and the second voltage threshold 404. In the current case, the third voltage threshold 406 is about 150 V. The fourth voltage threshold 408 is about 300 V.

It should be noted the first voltage threshold 402, the second voltage threshold 404, the third voltage threshold 406 and the fourth voltage threshold 408 described above are merely an example, which should not unduly limit the scope of the claims. One of ordinary skill in the art would recognize many variations, alternatives, and modifications.

FIG. 4 further shows the boost converter is activated twice in each half cycle. In other words, the boost converter has two activating periods during each half cycle. As shown in FIG. 4, in a half cycle, the boost converter is activated from t1 to t2, and from t3 to t4, respectively. The period between t1 to t2 is alternatively referred as a first activing period of the boost converter. The period between t3 to t4 is alternatively referred as a second activing period of the boost converter.

It should be noted that the arrangement of the first activating period and the second activating period shown in FIG. 4 is merely an example. One of ordinary skill in the art would recognize many variations, alternatives, and modifications. For example, depending on different applications and design needs, the second activating period may be placed before the first activating period.

The bulk capacitor C2 is employed to keep the voltage applied to the isolated power converter 106 over the minimum voltage to which the isolated power converter 106 is specified. Without having the boost converter and the second control scheme applied to the boost converter (two activating periods in each half cycle), a large bulk capacitor (e.g., a 68 uF capacitor) is necessary for keeping the voltage across the bulk capacitor over the minimum voltage of the isolated power converter 106. The boost converter can increase the voltage across the bulk capacitor when necessary. As a result, a smaller bulk capacitor (e.g., a 2.2 uF capacitor) may be used to maintain the voltage across the bulk capacitor over the minimum voltage of the isolated power converter 106.

Figure 5:
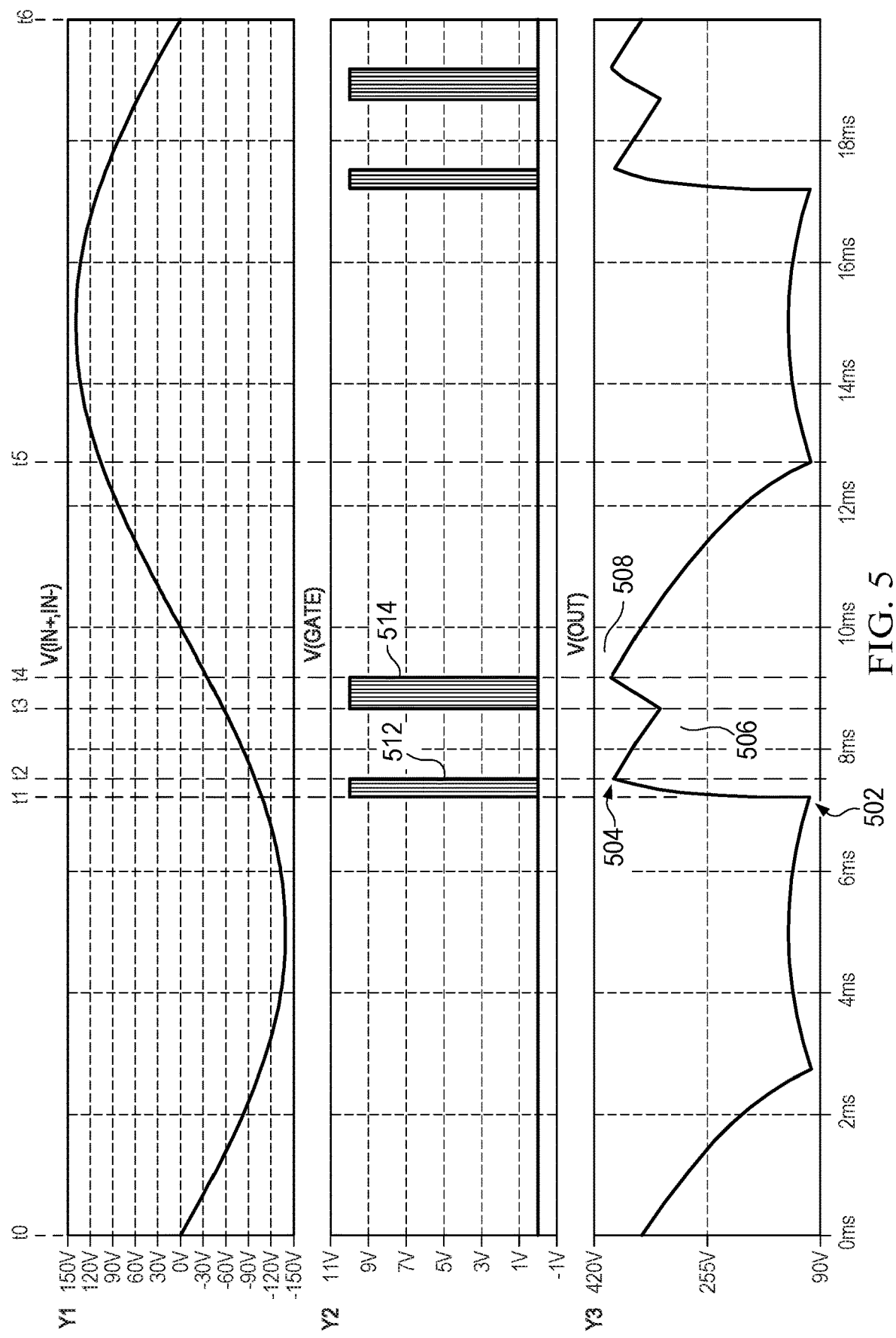
FIG. 5 illustrates various waveforms of the power supply system shown in FIG. 2 when the power supply system operates under a third control scheme in accordance with various embodiments of the present disclosure.

FIG. 5 illustrates various waveforms of the power supply system shown in FIG. 2 when the power supply system operates under a third control scheme in accordance with various embodiments of the present disclosure. The horizontal axis of FIG. 5 represents intervals of time. There may be three vertical axes. The first vertical axis Y1 represents the input voltage of the power supply system. The second vertical axis Y2 represents the gate drive signal of the boost converter shown in FIG. 2. The third vertical axis Y3 represents the voltage across the bulk capacitor C2.

The waveforms shown in FIG. 5 are generated when the power supply system shown in FIG. 2 operates at a low input voltage line. The load of the power supply system is about 45 W. A bulk capacitor of 2.2 uF is employed in the power supply system.

As shown in FIG. 5, the time from t0 to t6 represents one cycle of the input waveform. The input waveform has a frequency of 50 Hz. The cycle of the input waveform is about 20 milliseconds.

At the time instant t1, the voltage across the bulk capacitor C2 drops to a voltage level approximately equal to a first voltage threshold 502. The boost converter starts to switch and the voltage across the bulk capacitor C2 increases accordingly. During the time from t1 to t2, the switch of the boost converter is turned on and off as indicated by the gate drive signal 512. In response to the turn-on and turn-off of the switch, the voltage across the bulk capacitor C2 increases from the first voltage threshold 502 to a second voltage threshold 504. At t2, after the voltage across the bulk capacitor C2 reaches the second voltage threshold 504, the boost converter stops switching and the voltage across the bulk capacitor C2 starts to drop.

At the time instant t3, the voltage across the bulk capacitor C2 drops to a voltage level approximately equal to a third voltage threshold 506. The boost converter starts to switch and the voltage across the bulk capacitor C2 increases accordingly. During the time from t3 to t4, the switch of the boost converter is turned on and off as indicated by the gate drive signal 514. In response to the turn-on and turn-off of the switch, the voltage across the bulk capacitor C2 increases from the third voltage threshold 506 to a fourth voltage threshold 508. At t4, after the voltage across the bulk capacitor C2 reaches the fourth voltage threshold 508, the boost converter stops switching and the voltage across the bulk capacitor C2 starts to drop.

At t5, the voltage across the bulk capacitor C2 drops to a voltage level approximately equal to or above the first voltage threshold 502. It is not necessary to activate the boost converter at t5 because FIG. 5 shows the line voltage starts to increase above the first voltage threshold 502 at t5.

In some embodiments, the first voltage threshold 502 is the minimum voltage to which the isolated power converter 106 is specified. The second voltage threshold 504 is the maximum voltage to which the isolated power converter 106 is specified. In the current case, the first voltage threshold is about 110 V. The second voltage threshold is about 360 V. The third voltage threshold 506 is a voltage between the first voltage threshold and the second voltage threshold. In the current case, the third voltage threshold is about 320 V. The fourth voltage threshold 508 is approximately equal to the second voltage threshold 504.

It should be noted the first voltage threshold 502, the second voltage threshold 504, the third voltage threshold 506 and the fourth voltage threshold 508 described above are merely an example, which should not unduly limit the scope of the claims. One of ordinary skill in the art would recognize many variations, alternatives, and modifications.

FIG. 5 further shows the boost converter is activated twice in each half cycle. As shown in FIG. 5, in a half cycle, the boost converter is activated from t1 to t2, and from t3 to t4, respectively. The period between t1 to t2 is alternatively referred as a first activing period of the boost converter. The period between t3 to t4 is alternatively referred as a second activing period of the boost converter. It should be noted that, depending on different applications and design needs, the second activating period may be placed before the first activating period.

Figure 6:
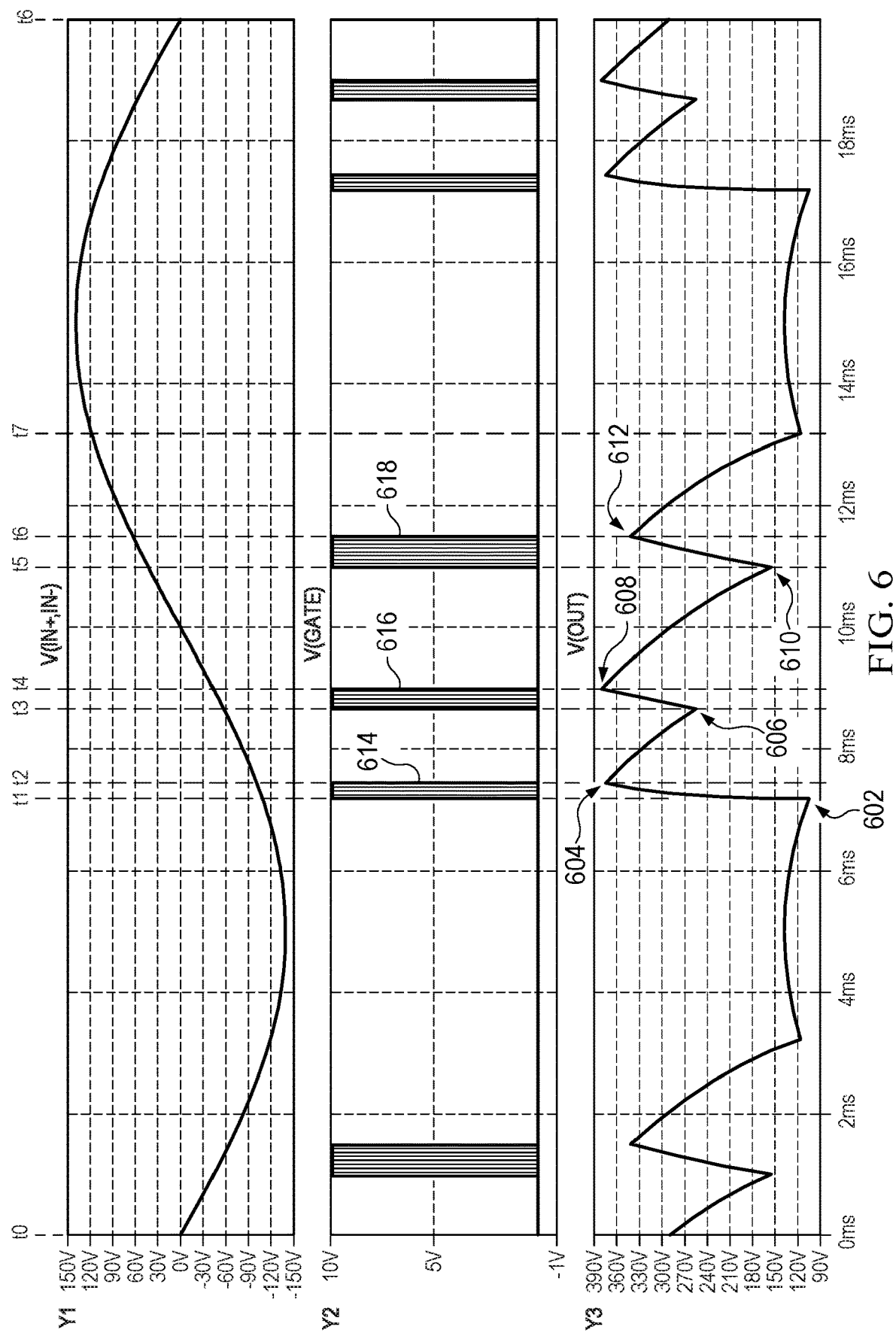
FIG. 6 illustrates various waveforms of the power supply system shown in FIG. 2 when the power supply system operates under a fourth control scheme in accordance with various embodiments of the present disclosure.

FIG. 6 illustrates various waveforms of the power supply system shown in FIG. 2 when the power supply system operates under a fourth control scheme in accordance with various embodiments of the present disclosure. The horizontal axis of FIG. 6 represents intervals of time. There may be three vertical axes. The first vertical axis Y1 represents the input voltage of the power supply system. The second vertical axis Y2 represents the gate drive signal of the boost converter shown in FIG. 2. The third vertical axis Y3 represents the voltage across the bulk capacitor C2.

The waveforms shown in FIG. 6 are generated when the power supply system shown in FIG. 2 operates at a low input voltage line. The load of the power supply system is about 45 W. A bulk capacitor of 1.5 uF is employed in the power supply system.

As shown in FIG. 6, the time from t0 to t8 represents one cycle of the input waveform. The input waveform has a frequency of 50 Hz. The cycle of the input waveform is about 20 milliseconds.

At the time instant t1, the voltage across the bulk capacitor C2 drops to a voltage level approximately equal to a first voltage threshold 602. The boost converter starts to switch and the voltage across the bulk capacitor C2 increases accordingly. During the time from t1 to t2, the switch of the boost converter is turned on and off as indicated by the gate drive signal 614. In response to the turn-on and turn-off of the switch, the voltage across the bulk capacitor C2 increases from the first voltage threshold 602 to a second voltage threshold 604. At t2, after the voltage across the bulk capacitor C2 reaches the second voltage threshold 604, the boost converter stops switching and the voltage across the bulk capacitor C2 starts to drop.

At the time instant t3, the voltage across the bulk capacitor C2 drops to a voltage level approximately equal to a third voltage threshold 606. The boost converter starts to switch and the voltage across the bulk capacitor C2 increases accordingly. During the time from t3 to t4, the switch of the boost converter is turned on and off as indicated by the gate drive signal 616. In response to the turn-on and turn-off of the switch, the voltage across the bulk capacitor C2 increases from the third voltage threshold 606 to a fourth voltage threshold 608. At t4, after the voltage across the bulk capacitor C2 reaches the fourth voltage threshold 608, the boost converter stops switching and the voltage across the bulk capacitor C2 starts to drop.

At the time instant t5, the voltage across the bulk capacitor C2 drops to a voltage level approximately equal to a fifth voltage threshold 610. The boost converter starts to switch and the voltage across the bulk capacitor C2 increases accordingly. During the time from t5 to t6, the switch of the boost converter is turned on and off as indicated by the gate drive signal 618. In response to the turn-on and turn-off of the switch, the voltage across the bulk capacitor C2 increases from the fifth voltage threshold 610 to a sixth voltage threshold 612. At t6, after the voltage across the bulk capacitor C2 reaches the sixth voltage threshold 612, the boost converter stops switching and the voltage across the bulk capacitor C2 starts to drop.

At t7, the voltage across the bulk capacitor C2 drops to a voltage level approximately equal to or above the first voltage threshold 602. It is not necessary to activate the boost converter at t7 because FIG. 6 shows the line voltage starts to increase above the first voltage threshold 602 at t7.

In some embodiments, the first voltage threshold 602 is the minimum voltage to which the isolated power converter 106 is specified. The second voltage threshold 604 is the maximum voltage to which the isolated power converter 106 is specified. In the current case, the first voltage threshold 602 is about 110 V. The second voltage threshold 604 is about 360 V. The third voltage threshold 606 is a voltage between the first voltage threshold and the second voltage threshold. In the current case, the third voltage threshold 606 is about 260 V. The fourth voltage threshold 608 is approximately equal to the second voltage threshold 604. The fifth voltage threshold 610 and the sixth voltage threshold 612 are voltages between the first voltage threshold 602 and the second voltage threshold 604. In the current case, the fifth voltage threshold 610 is about 150 V. The sixth voltage threshold 612 is about 330 V.

It should be noted the voltage thresholds described above are merely an example, which should not unduly limit the scope of the claims. One of ordinary skill in the art would recognize many variations, alternatives, and modifications.

FIG. 6 shows the boost converter has three activating periods in each half cycle. As shown in FIG. 6, a first activing period of the boost converter is from t1 to t2. A second activing period of the boost converter is from t3 to t4. A third activing period of the boost converter is from t5 to t6. It should be noted that the sequence of the three activing periods shown in FIG. 6 is merely an example. Depending on different applications and design needs, there are many variations. For example, the second activating period may be placed before the first activating period.

Figure 7:
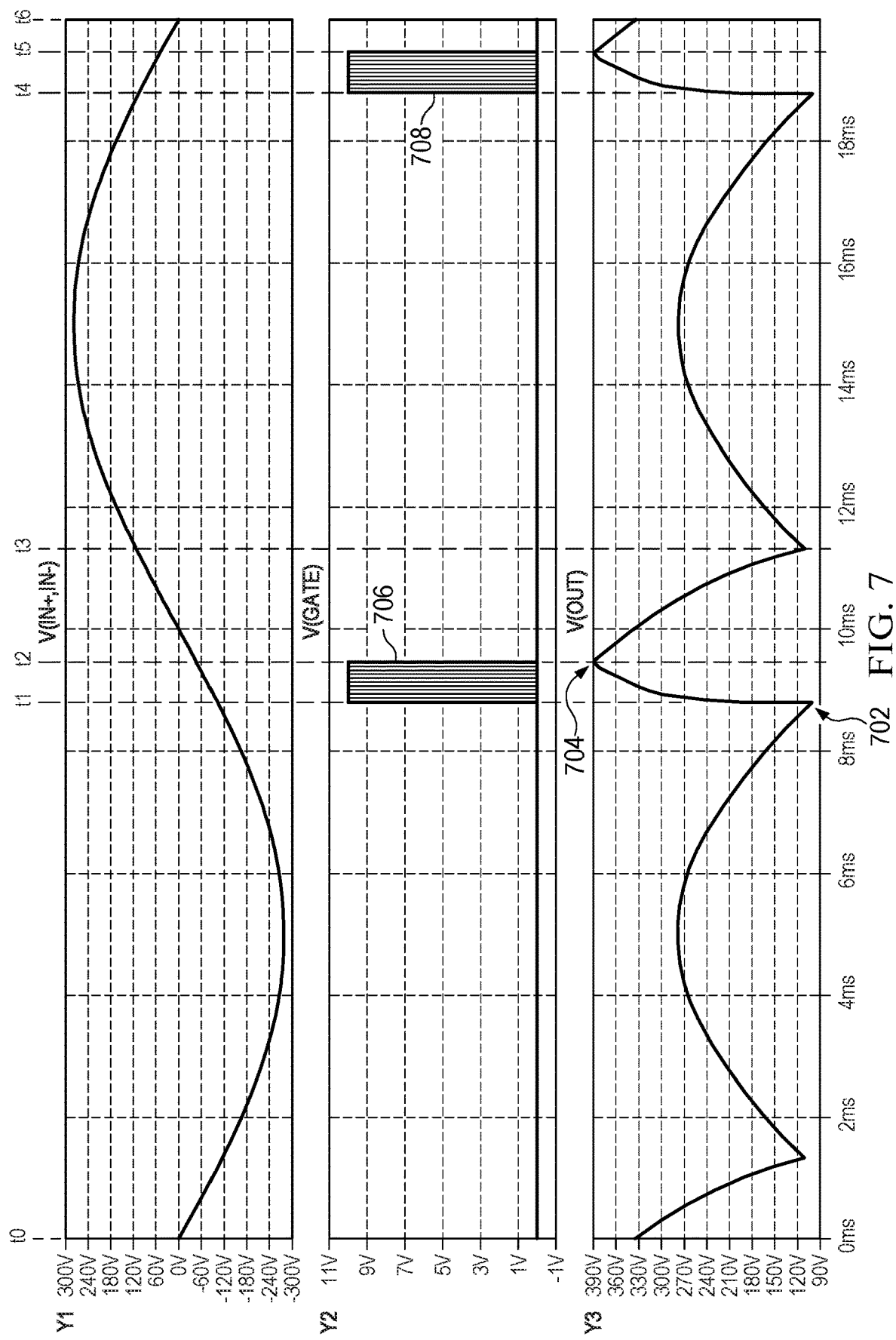
FIG. 7 illustrates various waveforms of the power supply system shown in FIG. 2 when the power supply system operates under a fifth control scheme in accordance with various embodiments of the present disclosure.

FIG. 7 illustrates various waveforms of the power supply system shown in FIG. 2 when the power supply system operates under a fifth control scheme in accordance with various embodiments of the present disclosure. The horizontal axis of FIG. 7 represents intervals of time. There may be three vertical axes. The first vertical axis Y1 represents the input voltage of the power supply system. The second vertical axis Y2 represents the gate drive signal of the boost converter shown in FIG. 2. The third vertical axis Y3 represents the voltage across the bulk capacitor C2.

The waveforms shown in FIG. 7 are generated when the power supply system shown in FIG. 2 operates at a high input voltage line. The load of the power supply system is about 45 W. A bulk capacitor of 1.2 uF is employed in the power supply system.

As shown in FIG. 7, the time from t0 to t6 represents one cycle of the input waveform. At the time instant t1, the voltage across the bulk capacitor C2 drops to a voltage level approximately equal to a first voltage threshold 702. The boost converter starts to switch and the voltage across the bulk capacitor C2 increases accordingly. During the time from t1 to t2, the switch of the boost converter is turned on and off as indicated by the gate drive signal 706. In response to the turn-on and turn-off of the switch, the voltage across the bulk capacitor C2 increases from the first voltage threshold 702 to a second voltage threshold 704. At t2, after the voltage across the bulk capacitor C2 reaches the second voltage threshold 704, the boost converter stops switching and the voltage across the bulk capacitor C2 starts to drop.

At t3, the voltage across the bulk capacitor C2 drops to a voltage level approximately equal to or above the first voltage threshold 702. It is not necessary to activate the boost converter at t3 because FIG. 7 shows the line voltage starts to increase above the first voltage threshold 702 at t3.

In some embodiments, the first voltage threshold 702 is the minimum voltage to which the isolated power converter 106 is specified. The second voltage threshold 704 is the maximum voltage to which the isolated power converter 106 is specified. In the current case, the first voltage threshold 702 is about 110 V. The second voltage threshold 704 is about 390 V.

It should be noted the first voltage threshold 702 and the second voltage threshold 704 described above are merely an example, which should not unduly limit the scope of the claims. One of ordinary skill in the art would recognize many variations, alternatives, and modifications.

FIG. 7 shows the boost converter is activated twice in each cycle. As shown in FIG. 7, in a first half cycle, the boost converter is activated from t1 to t2. Likewise, in a second half cycle, the boost converter is activated from t4 to t5 as indicated by the gate drive signals 708.

The bulk capacitor C2 is employed to keep the voltage applied to the isolated power converter 106 over the minimum voltage to which the isolated power converter 106 is specified. Without having the boost converter and the fifth control scheme applied to the boost converter (one activating period in each half cycle), a large bulk capacitor (e.g., an 8 uF capacitor) is necessary for keeping the voltage across the bulk capacitor over the minimum voltage of the isolated power converter 106. The boost converter can increase the voltage across the bulk capacitor when necessary. As a result, a smaller bulk capacitor (e.g., a 1.2 uF capacitor) may be used to maintain the voltage across the bulk capacitor over the minimum voltage of the isolated power converter 106.

It should be noted while FIG. 7 shows one activating period in each half cycle, additional activating periods may be employed to further reduce the size of the bulk capacitor C2.

Figure 8:
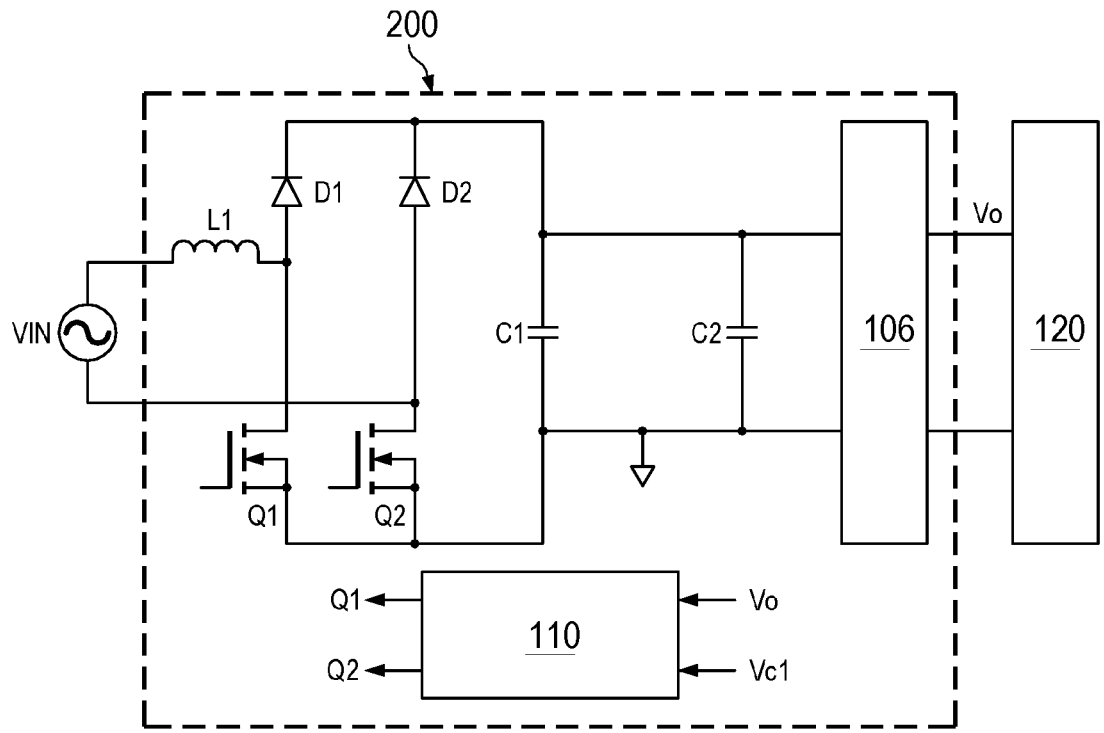
FIG. 8 illustrates another implementation of a power supply system having reduced bulk capacitance in accordance with various embodiments of the present disclosure.

FIG. 8 illustrates another implementation of a power supply system having reduced bulk capacitance in accordance with various embodiments of the present disclosure. The operating principle of the power supply system 200 shown in FIG. 8 is similar to that of the power supply system 100 shown in FIG. 2 except that the boost converter and the rectifier shown in FIG. 2 is replaced by two boost converters coupled in parallel.

A first boost converter is formed by an inductor L1, a first diode D1 and a first switch Q1. A second boost converter is formed by the inductor L1, a second diode D2 and a second switch Q2. As shown in FIG. 8, the inductor L1 is coupled between the input power source VIN and a common node of the first switch Q1 and the first diode D1. A cathode of the first diode D1 and a cathode of the second diode D2 are coupled together and further coupled to the bulk capacitor C2. A common node of the second switch Q2 and the second diode D2 is coupled to the input power source VIN.

The controller 110 may detect the voltage across the outputs of the isolated power converter 106 and the voltage across the terminals of the bulk capacitor C2. Based upon at least one of the detected voltages (e.g., the voltage across the terminals of the bulk capacitor C2), the controller 110 generates gate drive signals to control the on/off of the switches Q1 and Q2, respectively.

A first capacitor C1 and the bulk capacitor C2 are coupled in parallel across two input terminals of the isolated power converter 106. In some embodiments, the first capacitor C1 is a 0.1 uF capacitor with a 400 V voltage rating. The second capacitor C2 is a 2.2 uF capacitor with a 400 V voltage rating. Both the first capacitor C1 and the second capacitor C2 are ceramic capacitors.

In operation, the first boost converter is configured to be activated during a first half cycle of the input power source VIN. The second boost converter is configured to be activated during a second half cycle of the input power source VIN.

In operation, during the first half, when the voltage across the bulk capacitor C2 is equal to a first threshold, the first switch Q1 of the first boost converter starts switching, thereby increasing voltage across the bulk capacitor C2. When the voltage across the bulk capacitor C2 is equal to a second threshold, the first switch Q1 of the first boost converter stops switching. In some embodiments, the second threshold is greater than the first threshold.

During the second half, when the voltage across the bulk capacitor C2 is equal to a third threshold, the second switch Q2 of the second boost converter starts switching, thereby increasing voltage across the bulk capacitor C2. When the voltage across the bulk capacitor C2 is equal to a fourth threshold, the second switch Q2 of the second boost converter stops switching. In some embodiments, the fourth threshold is greater than the third threshold.

Figure 9:
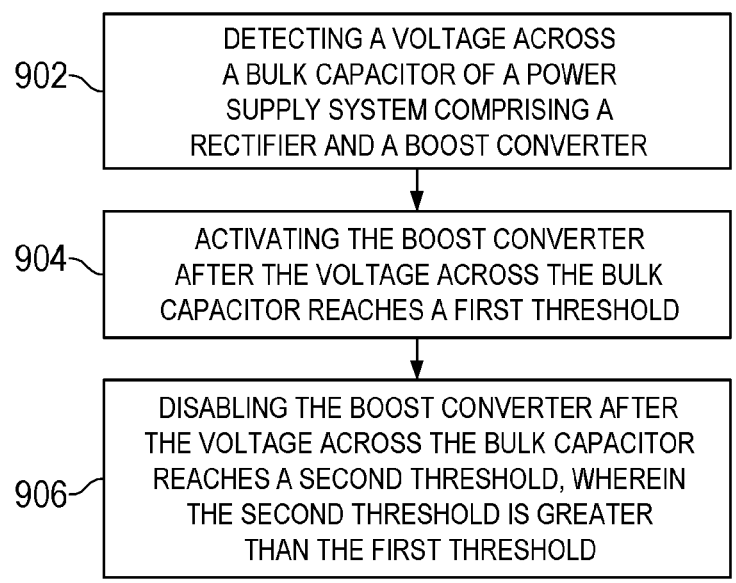
FIG. 9 illustrates a flow chart of controlling the boost converter shown in FIG. 2 in accordance with various embodiments of the present disclosure.

FIG. 9 illustrates a flow chart of controlling the boost converter shown in FIG. 2 in accordance with various embodiments of the present disclosure. This flow chart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

A power supply system comprises a rectifier, a boost apparatus, a power converter and a controller. A bulk capacitor is placed between the boost apparatus and the power converter. In some embodiments, the rectifier is a full-wave diode rectifier. The power converter is an isolated dc/dc converter. The boost apparatus is a non-isolated boost converter comprising an inductor, a switching and a blocking diode.

At step 902, the controller detects a voltage across the bulk capacitor. In some embodiments, the bulk capacitor is a 2.2 uF capacitor. It should be noted that, depending on different design needs, the voltage detection point may vary accordingly. For example, the controller may detect a voltage across the output of the rectifier. Based upon the detected voltage across the output of the rectifier, the controller may calculate the voltage across the bulk capacitor.

At step 904, the controller activates the boost converter after the voltage across the bulk capacitor is equal to a first voltage threshold. The boost converter enters an activating period in which a PWM mode is applied to a switch of the boost converter. In response to the activating period of the boost converter, the voltage across the bulk capacitor increases accordingly.

At step 906, the controller disables the boost converter after the voltage across the bulk capacitor is equal to a second voltage threshold, wherein the second voltage threshold is greater than the first voltage threshold. After the boost converter has been disabled, the switch of the boost converter is configured to operate as an always-off switch. The current of the power supply system flows from the rectifier to the power converter through a conductor path formed by the inductor and the blocking diode of the boost converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. For example, the term coupled is intended to refer to any connection, directly or indirectly, between two elements. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a rectifier coupled to an input power source having a sinusoidal output waveform;
a boost converter coupled between the rectifier and a bulk capacitor, the boost converter increases a voltage across the bulk capacitor in each cycle of the sinusoidal output waveform in response to the voltage across the bulk capacitor decreasing to a predetermined threshold, wherein the voltage across the capacitor is of a curved waveform in phase with the sinusoidal output waveform when the boost converter is disabled; and
an isolated power converter coupled to the bulk capacitor.

2. The system of claim 1, wherein the rectifier is a full-wave rectifier that is coupled in cascade with the boost converter between the input power source and the bulk capacitor.

3. The system of claim 1, wherein the boost converter is a charge pump converter.

4. The system of claim 1, further comprising:
a controller configured to detect at least one voltage of the voltage across the bulk capacitor or an output voltage of the rectifier, and generate at least one signal to control the boost converter.

5. A method comprising:
detecting a voltage across a bulk capacitor of a power supply system, the power supply system comprising a rectifier configured to be coupled to a power source having a sinusoidal output waveform, a boost converter coupled to the rectifier, a power converter and the bulk capacitor coupled between the boost converter and the power converter;
in each cycle of the power source, activating the boost converter after the voltage across the bulk capacitor decreases and reaches a first voltage threshold, wherein prior to activating the boost converter, the voltage across the bulk capacitor is of a curved waveform in phase with the sinusoidal output waveform from the power source; and
in each cycle of the power source, disabling the boost converter after the voltage across the bulk capacitor increases and reaches a second voltage threshold, the second voltage threshold being greater than the first voltage threshold.

6. The method of claim 5, wherein the rectifier is a full-wave rectifier, and the boost converter is a boost converter including a switch that is configured to adjust the voltage across the bulk capacitor.

7. The method of claim 6, further comprising:
during activating the boost converter, turning on and off the switch until the voltage across the bulk capacitor is equal to the second voltage threshold; and
during disabling the boost converter, turning off the switch.

8. The method of claim 5, further comprising:
after disabling the boost converter, activating the boost converter after the voltage across the bulk capacitor decreases and reaches a third voltage threshold between the first voltage threshold and the second voltage threshold; and
disabling the boost converter after the voltage across the bulk capacitor increases and reaches a fourth voltage threshold between the first voltage threshold and the second voltage threshold, wherein the fourth voltage threshold is greater than the third voltage threshold, wherein the third voltage threshold and the fourth voltage threshold are thresholds for adjusting the voltage across the bulk capacitor.

9. The method of claim 8, further comprising:
after disabling the boost converter, activating the boost converter after the voltage across the bulk capacitor decreases and reaches the third voltage threshold; and
disabling the boost converter after the voltage across the bulk capacitor increases and reaches the second voltage threshold.

10. The method of claim 5, wherein the first voltage threshold is a minimum input voltage of the power converter, and the second voltage threshold is a maximum input voltage of the power converter.

11. The method of claim 5, further comprising:
detecting, by a controller, the voltage across the bulk capacitor and a voltage at an output of the rectifier; and
generating, by the controller, a control signal for controlling the boost converter based upon the voltage across the bulk capacitor and the voltage at the output of the rectifier.

12. A method comprising:
detecting a voltage across a bulk capacitor of a power supply system configured to be coupled to an ac power source having a sinusoidal output waveform, the power supply system comprising a boost converter coupled to the bulk capacitor;
in each cycle of the ac power source, applying a first pulse width modulation (PWM) mode to at least one switch of the boost converter after the voltage across the bulk capacitor reaches a first voltage threshold, wherein prior to applying the first PWM mode to the at least one switch of the boost converter, the voltage across the bulk capacitor is of a curved waveform in phase with the sinusoidal output waveform from the ac power source; and
applying an always-off mode to at least one switch of the boost converter after the voltage across the bulk capacitor reaches a second voltage threshold, the second voltage threshold being greater than the first voltage threshold.

13. The method of claim 12, wherein the boost converter is a boost converter configured to adjust the voltage across the bulk capacitor.

14. The method of claim 12, wherein the boost converter comprises a first boost converter and a second boost converter coupled in parallel between an input power source and the bulk capacitor, the first boost converter configured to be activated during a first half cycle of the input power source, and the second boost converter configured to be activated during a second half cycle of the input power source.

15. The method of claim 12, further comprising:
after applying the always-off mode to the at least one switch of the boost converter after the voltage across the bulk capacitor reaches the second voltage threshold, applying a second PWM mode to the at least one switch of the boost converter after the voltage across the bulk capacitor reaches a third voltage threshold between the first voltage threshold and the second voltage threshold;

applying the always-off mode to the at least one switch of the boost converter after the voltage across the bulk capacitor reaches the second voltage threshold;

applying a third PWM mode to the at least one switch of the boost converter after the voltage across the bulk capacitor reaches a fourth voltage threshold between the first voltage threshold and the second voltage threshold, wherein the third voltage threshold is greater than the fourth voltage threshold; and applying the always-off mode to the at least one switch of the boost converter after the voltage across the bulk capacitor reaches a fifth voltage threshold between the first voltage threshold and the second voltage threshold, wherein the fifth voltage threshold is greater than the third voltage threshold, wherein the third voltage threshold, the fourth voltage threshold and the fifth voltage threshold are thresholds for adjusting the voltage across the bulk capacitor.

* * * * *